July 28, 1931. D. G. HOLIBAUGH 1,816,283
FOOD ARTICLE
Filed Nov. 12, 1928
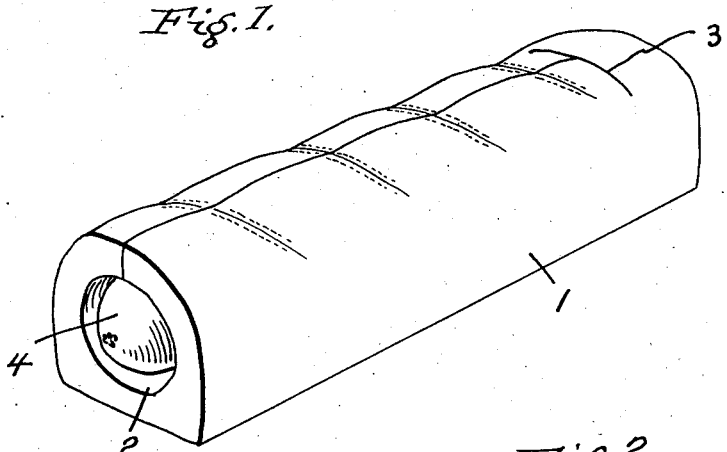
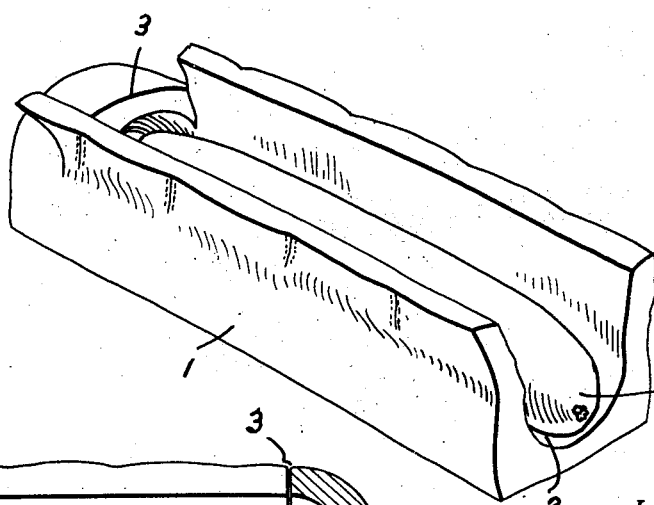
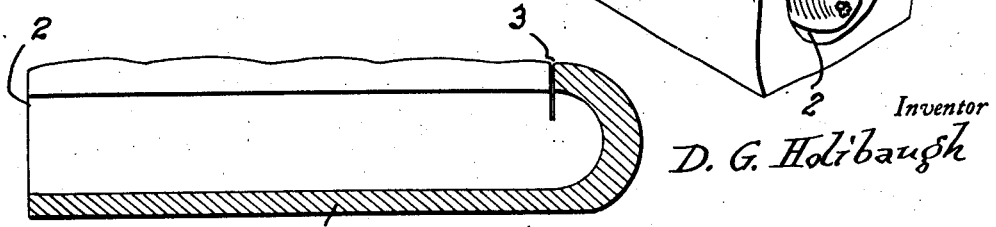
Inventor
D. G. Holibaugh
By Clarence A. O'Brien
Attorney Patented July 28, 1931

1,816,283

UNITED STATES PATENT OFFICE

DELBERT G. HOLIBAUGH, OF INDIANAPOLIS, INDIANA

FOOD ARTICLE

Application filed November 12, 1928. Serial No. 318,796.

The present invention pertains broadly to improvements in the class of invention known as food compounds, and more specifically the same relates to a novel food article in the form of a roll or bun. The existance of hollow rolls or buns in which food fillings may be placed is admittedly old in this art, and what the present invention attains through its more important object is the provision of a roll or bun of hollow construction, and of such improved construction as to permit the application of condiments to the filling after the filling has been placed in the roll.

Another very important object is to provide a hollow food article of this character in which the filling will be retained against flipping through one end thereof which is a disadvantage prevalent in rolls of this nature now being produced.

In the drawings wherein like reference characters indicate like parts:

Figure 1 represents a perspective view of the food article with a food filling therein.

Figure 2 also represents a perspective view of the roll showing a food filling deposited therein, and the edge portions of the splitted part of the roll separated to permit the application of condiments to the filling.

Figure 3 represents a longitudinal sectional view of the improved food article.

Referring to the drawings wherein like numerals designate like parts, the invention consists of a roll preferably of the elongated variety. This roll is designated by numeral 1 and is formed longitudinally and for the major portion of its length with a pocket 2 extending inwardly from one end of the roll.

The top of the roll is formed with a T-shaped slit clearly disclosed in Figure 1. The horizontal portion of this T-shaped slit is placed transversely at the closed end of the roll and is denoted by reference character 3. The vertical portion of the T-shaped slit extends longitudinally and cuts through the open end of the roll in the manner clearly shown in Figure 1.

In the preparation of the roll for eating, a sausage or in fact any other filling 4 is inserted within the pocket 2 of the roll. The edge portions of the roll at the longitudinally extending portion of the slit may be separated for depositing in the manner shown in Figure 2. Suitable condiment may be applied to the filling after which the edge portions of the roll are again closed in abutting position. While eating the filled roll, the same is to be preferably held with the open end up so that the closed end of the roll will serve to support the filling and prohibit any displacement thereof.

Obviously the gist of this invention may be applied to various shaped food articles of any ingredient composition without departing from the spirit and scope of the invention as claimed.

Having thus described the invention, what I claim as new and desire to secure by Letters Patent is:—

An article of food comprising, a tubular roll split longitudinally from one end, and for the major portion of its length, said roll being formed with a transverse slit intersecting the longitudinal slit to permit the edge portions of the roll at the longitudinal slit to be separated.

In testimony whereof I affix my signature.

DELBERT G. HOLIBAUGH.